(12) United States Patent
Suzuki et al.

(10) Patent No.: US 9,535,238 B2
(45) Date of Patent: Jan. 3, 2017

(54) IMAGING LENS

(71) Applicant: KANTATSU CO., LTD., Yaita-shi, Tochigi (JP)

(72) Inventors: Hisanori Suzuki, Sukagawa (JP); Kazuo Matsuoka, Saitama (JP)

(73) Assignee: KANTATSU CO., LTD., Yaita (JP)

( * ) Notice: Subject to any disclaimer, the term of this patent is extended or adjusted under 35 U.S.C. 154(b) by 670 days.

(21) Appl. No.: 13/803,772

(22) Filed: Mar. 14, 2013

(65) Prior Publication Data
US 2013/0258500 A1 Oct. 3, 2013

(30) Foreign Application Priority Data

Mar. 29, 2012 (JP) .................................. 2012-075624

(51) Int. Cl.
*G02B 13/18* (2006.01)
*G02B 13/00* (2006.01)
*G02B 27/00* (2006.01)

(52) U.S. Cl.
CPC ........... *G02B 13/18* (2013.01); *G02B 13/0045* (2013.01); *G02B 27/0037* (2013.01)

(58) Field of Classification Search
CPC . G02B 13/18; G02B 13/0045; G02B 27/0037; G02B 3/02; G02B 13/002
USPC ........ 359/763–764, 713–714, 656–659, 708, 359/750–770
See application file for complete search history.

(56) References Cited

U.S. PATENT DOCUMENTS

| | | | | |
|---|---|---|---|---|
| 6,052,234 A * | 4/2000 | Mukai et al. | ................. | 359/643 |
| 6,275,342 B1 * | 8/2001 | Sakamoto et al. | ............ | 359/691 |
| 2007/0229984 A1 * | 10/2007 | Shinohara | ..................... | 359/763 |
| 2010/0134904 A1 | 6/2010 | Tsai | | |
| 2012/0140104 A1 * | 6/2012 | Ozaki | .......................... | 348/335 |
| 2012/0162769 A1 * | 6/2012 | Suzuki et al. | ................ | 359/558 |
| 2012/0250167 A1 | 10/2012 | Hashimoto | | |
| 2013/0057966 A1 | 3/2013 | Tsai et al. | | |
| 2013/0057973 A1 * | 3/2013 | Kubota et al. | ................ | 359/764 |
| 2013/0258185 A1 * | 10/2013 | Chang et al. | ................ | 348/374 |
| 2015/0286036 A1 * | 10/2015 | Kondo | .............. | G02B 13/0045 359/714 |

FOREIGN PATENT DOCUMENTS

| | | | |
|---|---|---|---|
| JP | 10-213744 A | 8/1998 | |
| JP | 10213744 A | 8/1998 | |
| JP | 11-23968 A | 1/1999 | |
| JP | 2007-264180 A | 10/2007 | |
| JP | 2010-197665 A | 9/2010 | |

(Continued)

*Primary Examiner* — Zachary Wilkes
*Assistant Examiner* — George G King
(74) *Attorney, Agent, or Firm* — Oliff PLC

(57) ABSTRACT

A compact imaging lens suitable for a high pixel density image pickup device which properly corrects chromatic aberration and other types of aberrations and ensures high image quality, low f-number, and low cost. A first lens, second lens, third lens, fourth lens, and fifth lens are arranged in order from the object side and both sides of all the lenses are aspheric surfaces and a diffractive optical surface with a chromatic aberration correction function is formed on one of the surfaces from the object side surface of the first lens to the object side surface of the second lens and on one of the surfaces from the object side surface of the third lens to the object side surface of the fifth lens. All the lenses are made of a plastic material.

16 Claims, 10 Drawing Sheets

(56) References Cited

FOREIGN PATENT DOCUMENTS

| WO | 2010-079549 A1 | 7/2010 |
| WO | 2010079549 A1 | 7/2010 |
| WO | 2011/027690 A1 | 3/2011 |
| WO | 2011027690 A1 | 3/2011 |

* cited by examiner

IMAGING LENS

The present application is based on and claims priority of Japanese patent application No. 2012-075624 filed on Mar. 29, 2012, the entire contents of which are hereby incorporated by reference.

BACKGROUND OF THE INVENTION

1. Field of the Invention

The present invention relates to imaging lenses which form an image of an object on an image pickup device such as a CCD (Charge Coupled Device) sensor or CMOS (Complementary Metal Oxide Semiconductor) sensor and more particularly to compact imaging lenses which are mounted in PDA (personal digital assistants) such as mobile phones and the others.

2. Description of the Related Art

Today most mobile phones have a camera function and recently mobile phone models with a high resolution camera function comparable to a digital still camera have been introduced into the market. The pixel size in an image pickup device is very small and the pixel pitch is less than 1.4 microns. On the other hand, as mobile phones become smaller and thinner, there is a demand for smaller imaging lenses and in order to cope with the demand for compactness of imaging lenses and higher resolution of image pickup devices, the need to improve the aberration correction capability of an imaging lens is becoming stronger.

Conventionally, imaging lenses for mobile devices such as mobile phones and smart phones have been made of aspheric plastics, in which aberration correction is made mainly by a lens array combination, namely combination of lens power and lens shapes. Chromatic aberration has also been corrected similarly and examples of such imaging lens configurations are described in JP-A No. 2007-264180 (Patent Document 1) and JP-A No. 2010-197665 (Patent Document 2).

On the other hand, for chromatic aberration correction, a method which uses a diffractive surface is known and it has been already applied to zoom lenses (JP-A No. H10-213744 (Patent Document 3) and JP-A No. H11-23968 (Patent Document 4)). However, it has been rarely applied to light and compact fixed-focus cameras, namely imaging lenses for mobile phones and smart phones.

Considering that image pickup devices tend to provide higher resolution and the temperature dependence of plastic lens refractive index is high, a high accuracy chromatic aberration correction method should be adopted for imaging lenses for mobile phones as well.

The diffraction method takes advantage of the fact that the Abbe number (d-ray) of a diffractive surface is −3.452 (negative value), in which a single lens is used to implement an achromatic mechanism which would be implemented using two (positive and negative) lenses in a conventional technique. It is also a useful technique in an effort to decrease the number of lenses and shorten the total optical length of the imaging lens.

Next, related art techniques will be described.

The imaging lens described in Patent Document 1 is comprised of five lenses which are located in the following order from the object side: a first lens a with positive refractive power, a second lens as a negative meniscus lens with a concave surface on the image side, a third lens as a positive meniscus lens with a convex surface on the image side, a fourth lens with negative refractive power, and a fifth lens with negative refractive power having a concave surface on the image side near the optical axis. This technique is designed to ensure chromatic aberration correction and telecentricity, in which a low-dispersion material is used for the first lens, a high-dispersion material is used for the second and fourth lenses and for the fourth and fifth lenses, a conditional expression concerning lens thickness and inter-lens distance and a conditional expression concerning focal length are derived to correct chromatic aberration. The F-value is 2.8 or so and the half-angle of view is 31.9°, though both the F-value and half-angle of view are insufficient for adaptation to a high density image pickup device. In addition, since a glass material is used, the technique is disadvantageous from the viewpoint of cost reduction.

Similarly the imaging lens described in Patent Document 2 includes five lenses arranged in the following order: positive, negative, positive, positive and negative power lenses. In this technique, the second lens is mainly used for chromatic aberration correction, namely the second lens is largely responsible for chromatic aberration correction, so it should have large refractive power and manufacturing tolerance is tight. The F-value is 2.8 or so, which is insufficient.

The above two techniques only use an array of lenses to make chromatic aberration correction, but correction of chromatic aberration and other various types of aberrations by a lens array combination has limitations and design freedom in such techniques is very low.

On the other hand, Patent Document 3 describes a two-group zoom lens in which each group has a diffractive surface to correct axial chromatic aberration from a telescopic end to a wide-angle end. As far as comparison is made on the telescopic end and wide-angle end, it is hard to say that the use of two diffractive surfaces is more advantageous in spherical aberration correction than the use of a single diffractive surface. Patent Document 4 describes a three-group zoom lens in which one group has a diffractive surface to correct axial chromatic aberration and chromatic aberration of magnification from a telescopic end to a wide-angle end. Whereas, as mentioned above, zoom lenses use a diffractive surface to ensure that chromatic aberrations at the telescopic end and wide-angle end are corrected, fixed focal length lenses rarely use a diffractive surface.

SUMMARY OF THE INVENTION

The present invention has been made in view of the above problem of the related art techniques and has an object to provide a compact high-performance imaging lens with a small F-value which uses two diffractive surfaces to correct chromatic aberration effectively, copes with the tendency toward reduction in thickness in mobile devices such as mobile phones and properly corrects other various types of aberrations.

According to an aspect of the present invention, in order to solve the above problem, a first lens, second lens, third lens, fourth lens, and fifth lens are arranged in order from the object side and both sides of all the lenses are aspheric surfaces and a diffractive optical surface with a chromatic aberration correction function is formed on one of the surfaces from the object side surface of the first lens to the object side surface of the second lens and on one of the surfaces from the object side surface of the third lens to the object side surface of the fifth lens and all the lenses are made of a plastic material.

In the above configuration, the diffractive optical surfaces are formed on two optimum surfaces so as to correct chromatic aberration and other various types of aberrations properly.

The reason why two diffractive optical surfaces are provided is explained below.

A diffractive optical surface is a relief formed on a lens surface which produces an optical path difference. Usually, whereas the Abbe number (e-ray) of an optical lens material is in the range from about 23 to about 80, the Abbe number (e-ray) of a diffractive optical surface is about −3.3, a number with the reverse sign, which indicates one-digit larger diffraction. Since the dependence of refractive index on wavelength is reversed, chromatic aberration can be corrected effectively by a diffractive optical surface formed on an appropriate surface.

Usually, in a lens system which does not use a diffractive optical surface, a lens of high dispersion material for chromatic aberration correction is located near an aperture stop. It is also known that in a lens system which corrects Seidel's five aberrations optimally, in order to correct axial chromatic aberration and chromatic aberration of magnification simultaneously, an optimum dispersion material is located in a remote place from the aperture stop. The same concept is applied to the formation of a diffractive surface. Specifically, a diffractive optical surface located near the aperture stop is effective in correction of axial chromatic aberration and further a diffractive optical surface located in a remote place from the aperture stop is more effective in chromatic aberration correction.

Since a diffractive optical surface located on a surface with less variation in the incidence angle and exit angle of principal rays provides higher diffraction efficiency, in the present invention a first diffractive optical surface is formed on one of the surfaces from the object side surface of the first lens to the object side surface of the second lens.

Since the first diffractive optical surface located near the aperture stop is not enough to correct axial chromatic aberration and chromatic aberration of magnification simultaneously in an optimum manner, a second diffractive optical surface is located in a remote place from the aperture stop. A diffractive optical surface can change the effect of chromatic aberration correction continuously by varying the optical path difference function. By a combination of materials different in dispersive power and a combination of two optical diffractive surfaces located in different places, the chromatic aberration correction capability can be improved and the design freedom for correction of other various types of aberrations can be increased.

In the present invention, in order to achieve a chromatic aberration correction effect, the second lens not only has negative refractive power and but also it is made of a high dispersion material. Conventionally, when chromatic aberration is corrected only by a lens array, if the second lens is mainly responsible for correction of axial chromatic aberration, the negative refractive power of the second lens must be increased and in order to compensate for this, the refractive power of other lenses with positive refractive power in the lens system must be increased. As a consequence, each lens should be thicker, which is disadvantageous from the viewpoint of lens compactness, and at the same time, sensitivity to tolerance becomes higher and productivity declines. Therefore, in the present invention, the refractive power of the second lens is low and one diffractive optical surface is located in an optimum place near the aperture stop for correction of axial chromatic aberration and the other diffractive optical surface is used to correct the residual chromatic aberration of magnification.

Next, the lens configuration of an imaging lens according to the present invention will be described.

In the imaging lens according to the present invention, a first lens is a biconvex lens near an optical axis, a second lens is a lens with negative refractive power, a third lens is a biconvex lens near the optical axis with positive refractive power, a fourth lens is a meniscus lens with positive refractive power having a concave surface on the object side near the optical axis, and a fifth lens is a lens with negative refractive power having a convex surface on the object side near the optical axis and an aperture stop is located on the object side surface of the first lens.

The advantageous effect of the biconvex lens as the first lens is described next. Since the third, fourth, and fifth lenses are nearer to the image plane than the first and second lenses, their areas through which light rays to reach the center of the image height pass are relatively small and they are less involved in correction of axial chromatic aberration. For this reason, the first and second lenses are used to correct axial chromatic aberration. When a biconvex lens is used as the first lens, both its surfaces on the object side and image side can be positive refractive power surfaces with a gentle curvature radius, making it possible to prevent spherical aberration caused by the first lens, ensure low tolerance sensitivity and suppress other types of aberrations in a balanced manner.

The second lens plays a major role in not only chromatic aberration correction but also correction of astigmatism and comma aberration. Generally, when the curvature radius of the object side surface of the second lens is larger than the curvature radius of its image side surface, the negative refractive power of the object side surface does not become larger than necessary, so aggravation of various types of aberrations due to increased field curvature and off-axial rays is prevented. Also, when the negative refractive power of the image side surface of the second lens is not larger than necessary, rise in tolerance sensitivity is suppressed. In the present invention, diffractive optical surfaces are formed in appropriate places so that the above various types of aberrations and tolerance sensitivity are effectively suppressed.

The third lens is a biconvex lens near the optical axis with little refractive power and plays an important role in off-axial aberration correction. In order to correct off-axial aberration properly, the aspheric surface shape is designed so that the amount of sag to the object side changes more largely in a position nearer to the lens periphery. Also the use of a lens with little refractive power is advantageous in shortening the total track length (TTL) because the thickness can be reduced.

Since the fourth lens is a positive refractive power meniscus lens with a concave object side surface and the fifth lens has negative refractive power with a concave image side surface, the total track length is shortened and various types of aberrations related to off-axial rays are properly corrected. The use of a positive refractive power meniscus lens with a concave object side surface as the fourth lens makes it possible to maintain adequate back focus and prevent an increase in total track length. In addition, the fifth lens has negative refractive power and has a concave image side surface with an optimum aspheric shape, thereby reducing distortion and ensuring telecentricity of principal rays incident on the image pickup device.

Furthermore, since the aperture stop is located on the object side surface of the first lens, the angle of principal rays incident on the image pickup device is held within a given range by keeping the exit pupil position away from the image plane.

The imaging lens according to the present invention is characterized by satisfying the following conditional expressions:

$$-2.80 \leq f2/f \leq -1.10 \quad (1)$$

$$2.80 \leq f3/f \quad (2)$$

$$-20.00 \leq f45/f \leq -3.33 \quad (3)$$

where:
f: focal length of the overall optical system
f2: focal length of the second lens
f3: focal length of the third lens
f45: composite focal length of the fourth lens and fifth lens The conditional expression (1) concerns the refractive power of the second lens and represents a condition to correct chromatic aberration to a certain degree and correct field curvature and other types of aberrations properly. As disclosed in Patent Document 2, it is a basic condition for field curvature correction that the second lens has strong negative power and chromatic aberration can also be corrected by the use of a dispersive material. However, in an attempt to correct most of chromatic aberration in the overall optical system only by the second lens, the negative refractive power of the second lens must be increased and the refractive power of the other positive lenses must be increased in order to maintain the refractive power of the overall optical system. As the individual lenses have stronger refractive power, inevitably tolerance sensitivity becomes higher, leading to a decline in productivity. Furthermore, as refractive power increases, the refractive surface curvature radius becomes smaller and the lens center thickness and edge thickness increase, which is disadvantageous in an effort to shorten the total track length. In the present invention, the second lens with negative refractive power located near the aperture stop and the diffractive optical surface located in an optimum position near the aperture stop share the responsibility for chromatic aberration correction, so the refractive power of the second lens can be reduced to avoid the above problem. If f2/f in the conditional expression (1) is above the upper limit value of "−1.10", the negative refractive power of the second lens would be too strong, resulting in an increase in the total track length. Also, undesirably the tolerance sensitivity of the second lens would increase. If f2/f in the conditional expression (1) is below the lower limit value of "−2.80", the refractive power of the second lens would be too weak, resulting in an increase in Petzval sum and making field curvature correction difficult. Furthermore, if so, the chromatic aberration correction capability of the second lens would deteriorate and the diffractive optical surface must bear a heavier burden in chromatic aberration correction. Undesirably this would lead to a tendency toward increased residual chromatic aberration due to the diffractive optical surface.

The conditional expression (2) concerns the positive refractive power of the third lens and represents a condition to compensate for insufficiency of the Petzval sum correction capability of the second lens for field curvature correction and also correct astigmatism and coma aberration properly. If f3/f in the conditional expression (2) is below the lower limit value of "2.80", the refractive power of the third lens would be too strong and the lens thickness would increase, which is disadvantageous in an effort to shorten the total track length. Also it would be difficult to correct field curvature, astigmatism and coma aberration.

The conditional expression (3) concerns the combined refractive power of the fourth and fifth lenses and represents a condition to shorten the total track length, ensure adequate back focus, correct distortion and optimize the control of principal rays' angle of incidence on the image pickup device. If f45/f in the conditional expression (3) is below the lower limit value of "−20", it would be advantageous in shortening the total track length. However, undesirably distortion would increase in the positive direction and at the same time the incidence angle of principal rays would increase. If f45/f is above the upper limit value of "−3.33", it would be easy to ensure back focus but the total track length would increase.

The present invention is characterized by satisfying the following conditional expressions:

$$10 < fDOE1/f < 100 \quad (4)$$

$$10 < |fDOE2/f| \quad (5)$$

where:
fDOE1: focal length of a first diffractive surface
fDOE2: focal length of a second diffractive surface.

The conditional expression (4) defines the ratio of the focal length of the first optical diffractive surface to the focal length of the overall optical system and mainly concerns correction of axial chromatic aberration. If the ratio is below the lower limit value of "10", the focal length of the first diffractive optical surface would decrease, leading to excessive chromatic aberration correction and excessive spherical aberration correction. On the other hand, if the ratio exceeds the upper limit value of "100", the focal length of the first diffractive optical surface would increase, leading to insufficient correction of spherical aberration and chromatic aberration of magnification.

The conditional expression (5) defines the ratio of the focal length of the second optical diffractive surface to the focal length of the overall optical system and mainly concerns correction of chromatic aberration of magnification. If the ratio is below the lower limit value of "10", the focal length of the second diffractive optical surface would decrease, leading to excessive correction of spherical aberration and chromatic aberration of magnification.

The present invention is characterized by satisfying the following conditions:

$$1 < |fDOE2/fDOE1| < 30 \quad (6)$$

The conditional expression (6) defines the ratio of the focal length of the first optical diffractive surface to the focal length of the second optical diffractive surface.

DETAILED DESCRIPTION OF THE PREFERRED EMBODIMENTS

Next, the preferred embodiments of the present invention will be described in detail referring to the accompanying drawings. FIGS. 1, 3, 5, 7, and 9 show lens cross sections corresponding to the first to fifth embodiments of the present invention, respectively. Since all these embodiments have the same basic lens configuration, the lens configuration of an imaging lens according to the present invention is explained below referring to the lens sectional views of the first embodiment.

Figure 1:
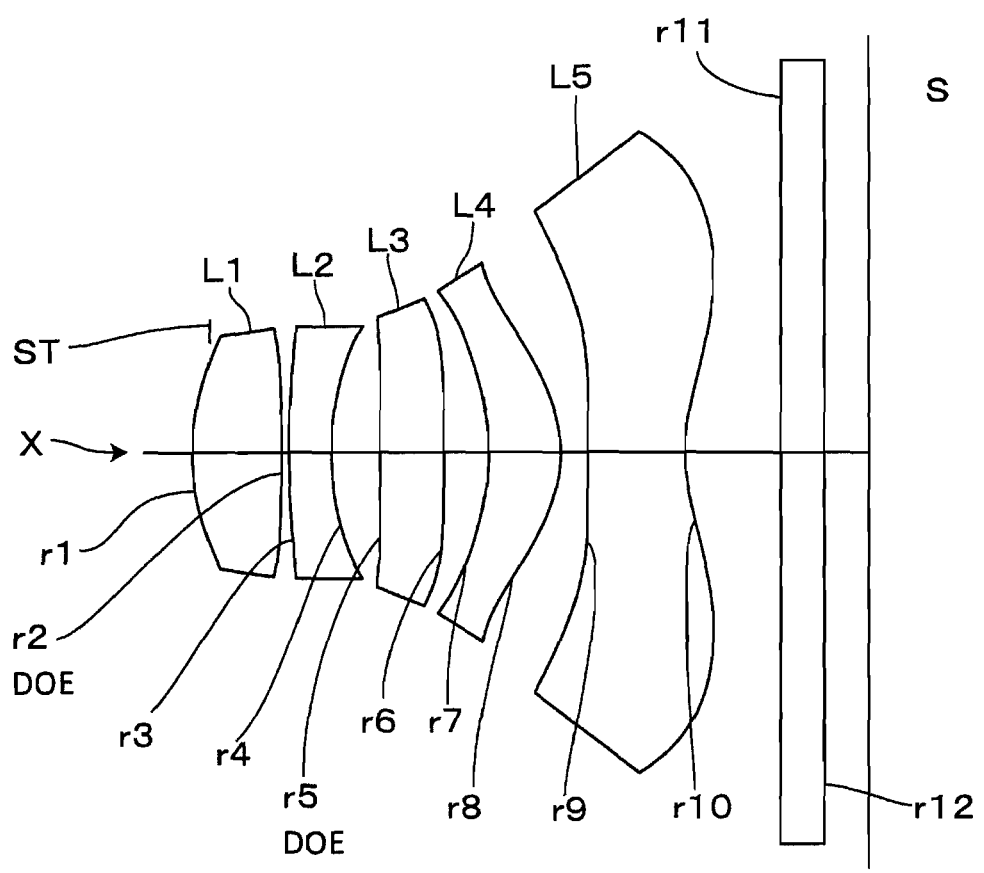
FIG. 1 is a sectional view of an imaging lens according to a first embodiment of the present invention.

As shown in FIG. 1, in the imaging lens according to the present invention, first lens L1 is a biconvex lens, second lens L2 has negative refractive power with a concave surface on the image side, third lens L3 is a biconvex lens with positive refractive power, fourth lens L4 is a meniscus lens with positive refractive power having a concave surface on the object side, and fifth lens L5 has negative refractive power with a convex surface on the object side. Both sides of all the lenses are aspheric surfaces and every lens is made of a plastic material.

In all the embodiments, the effective diameter peripheral edge of the object side surface r1 of the first lens L1 functions as an aperture stop ST. A cover glass comprised of r11 and r12 is located between the image side surface r10 of the fifth lens and image plane S. In FIG. 1, X represents an optical axis and DOE represents a diffractive optical surface.

In the embodiments, all the lens surfaces are aspheric. The aspheric surface shape of the lens surfaces is expressed by Equation 1, where Z represents an axis in the optical axis direction, Y represents height perpendicular to the optical axis, K represents the conic constant, and A2$i$ represents aspheric surface coefficient.

Also a diffractive optical surface DOE with an optical path difference function expressed by Equation 2 is formed on one of the surfaces from the object side surface r1 of the first lens L1 to the object side surface r3 of the second lens L2 and one of the surfaces from the object side surface r5 of the third lens L3 to the object side surface r9 of the fifth lens L5.

$$Z = \frac{\frac{Y^2}{R}}{1 + \sqrt{1 - (1+K) \times \frac{Y^2}{R^2}}} + \sum_{i=1}^{8} A_{2i} \times Y^{2i} \quad \text{Equation 1}$$

$$P = \sum_{i=1}^{7} B_{2i} Y^{2i} \quad \text{Equation 2}$$

where
P: optical path difference
B2$i$: coefficient of optical path difference function (i=1 to 7)

Next, imaging lenses according to the preferred embodiments of the present invention will be explained. In each embodiment, f represents the focal length of the overall optical system, Fno represents F-number, and ω represents half-angle of view. A surface number is a number counted from the object side, r represents curvature radius, d represents the distance between lens surfaces along the optical axis (inter-surface distance), n represents refractive index with respect to e-ray, and v represents Abbe number.

First Embodiment

Table 1 shows basic lens data. In this embodiment, diffractive optical surfaces DOE are formed on the image side surface r2 of the first lens L1 and the object side surface r5 of the third lens L3.

TABLE 1

Surface data

| Surface No. | r | d | n | v |
|---|---|---|---|---|
| Object surface | ∞ | ∞ | | |
| 1 (stop) | 1.6700 | 0.6158 | 1.5386 | 56.1 |
| 2 (DOE) | −16.7416 | 0.0506 | | |
| 3 | 6.1999 | 0.290 | 1.6242 | 25.4 |
| 4 | 1.9617 | 0.3392 | | |
| 5 (DOE) | 13.9584 | 0.441 | 1.5386 | 56.1 |
| 6 | −24.9881 | 0.307 | | |
| 7 | −1.6896 | 0.5004 | 1.5386 | 56.1 |
| 8 | −0.9111 | 0.1851 | | |
| 9 | 19.5313 | 0.6713 | 1.5386 | 56.1 |
| 10 | 1.2049 | 0.6590 | | |
| 11 | ∞ | 0.30 | 1.5201 | 64.0 |
| 12 | ∞ | 0.30 | | |
| Image plane | ∞ | | | | f = 3.8284,
Fno = 2.5186,
ω = 36.6°

Next, data on aspheric surface coefficients and coefficients of optical path difference function of the diffractive optical surfaces in the first embodiment are listed below.

TABLE 2

Aspheric data

| First surface Aspheric coefficient | Second surface Aspheric coefficient |
|---|---|
| k = −2.1898E+00 | k = 16.1942E+00 |
| A2 = 0.0000E+00 | A2 = 0.0000E+00 |
| A4 = 4.7661E-02 | A4 = −1.0516E-01 |
| A6 = −1.678E-02 | A6 = 4.8217E-01 |
| A8 = 1.4794E-02 | A8 = −1.2854E+00 |
| A10 = −1.1732E-01 | A10 = 1.4579E+00 |
| A12 = 1.8083E-01 | A12 = −5.0070E-01 |
| A14 = −1.2813E-01 | A14 = −4.5946E-01 |
| A16 = 0.0000E+00 | A16 = 3.2651E-01 |

| Third surface Aspheric coefficient | Fourth surface Aspheric coefficient |
|---|---|
| k = 41.3751E+00 | k = −3.8918E-01 |
| A2 = 0.0000E+00 | A2 = 0.0000E+00 |
| A4 = −1.0333E-01 | A4 = −5.7655E-02 |
| A6 = 3.2016E-01 | A6 = 2.1557E-01 |
| A8 = −6.5461E-01 | A8 = −1.9689E-01 |
| A10 = 4.2711E-01 | A10 = −1.0269E-02 |
| A12 = 1.7294E-01 | A12 = 2.2743E-01 |
| A14 = −2.7348E-01 | A14 = −1.1670E-01 |
| A16 = 0.0000E+00 | A16 = 0.0000E+00 |

| Fifth surface Aspheric coefficient | Sixth surface Aspheric coefficient |
|---|---|
| k = 75.8886E+00 | k = −99.00E+00 |
| A2 = 0.0000E+00 | A2 = 0.0000E+00 |
| A4 = −9.5198E-02 | A4 = −4.3735E-02 |
| A6 = 2.4305E-02 | A6 = −4.082E-03 |
| A8 = −1.7291E-01 | A8 = −8.5874E-02 |
| A10 = 5.031E-01 | A10 = 3.0945E-02 |
| A12 = −6.0260E-01 | A12 = 5.2312E-02 |

TABLE 2-continued

Aspheric data

| A14 = 2.9634E−01 | A14 = −7.8658E−02 |
| A16 = 0.0000E+00 | A16 = 3.8813E−02 |

| Seventh surface Aspheric coefficient | Eighth surface Aspheric coefficient |
|---|---|
| k = 1.0528E+00 | k = −3.6394E+00 |
| A2 = 0.0000E+00 | A2 = 0.0000E+00 |
| A4 = 1.4920E−01 | A4 = −1.5988E−01 |
| A6 = −9.8155E−02 | A6 = 1.1606E−01 |
| A8 = 1.6259E−01 | A8 = −5.985E−03 |
| A10 = −1.4892E−01 | A10 = −1.4031E−02 |
| A12 = 1.7384E−02 | A12 = 6.1606E−03 |
| A14 = 3.2544E−02 | A14 = 1.7543E−03 |
| A16 = 0.0000E+00 | A16 = −1.343E−03 |

| Ninth surface Aspheric coefficient | Tenth surface Aspheric coefficient |
|---|---|
| k = 55.5219E+00 | k = −7.9596E+00 |
| A2 = 0.0000E+00 | A2 = 0.0000E+00 |
| A4 = −1.3159E−01 | A4 = −7.6491E−02 |
| A6 = 8.0018E−03 | A6 = 1.9359E−02 |
| A8 = 3.2136E−02 | A8 = −3.662E−03 |
| A10 = −1.4626E−02 | A10 = 3.545E−04 |
| A12 = 7.099E−04 | A12 = −4.03E−05 |
| A14 = 8.433E−04 | A14 = 7.08E−06 |
| A16 = −1.41E−04 | A16 = −7.52E−07 |

| Second surface Optical path difference function | Fifth surface Optical path difference function |
|---|---|
| B2 = −6.008E−03 | B2 = 9.259E−04 |
| B4 = 3.1281E−02 | B4 = −1.42E−03 |
| B6 = −1.5247E−01 | B6 = 6.03E−03 |
| B8 = 4.1451E−01 | B8 = −1.17E−02 |
| B10 = −6.4119E−01 | B10 = 6.63E−04 |
| B12 = 5.4874E−01 | B12 = 1.03E−02 |
| B14 = −2.0057E−01 | B14 = −5.99E−03 |

(1) f2/f = −1.2418
(2) f3/f = 4.5206
(3) f45/f = −7.9557
(4) fDOE1/f = 20.69
(5) |fDOE2/f| = 134.32
(6) |fDOE2/fDOE1| = 6.48

Therefore, the imaging lens in the first embodiment satisfies conditional expressions (1) to (6).

Figure 2:
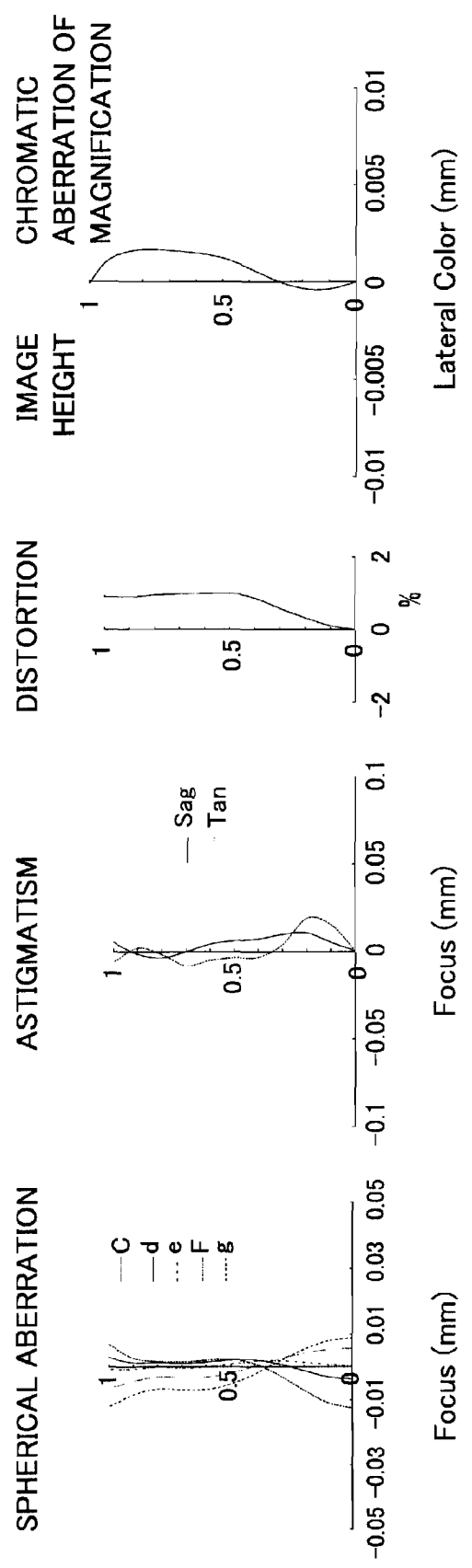
FIG. 2 shows various types of aberrations according to the first embodiment.
Figure 3:
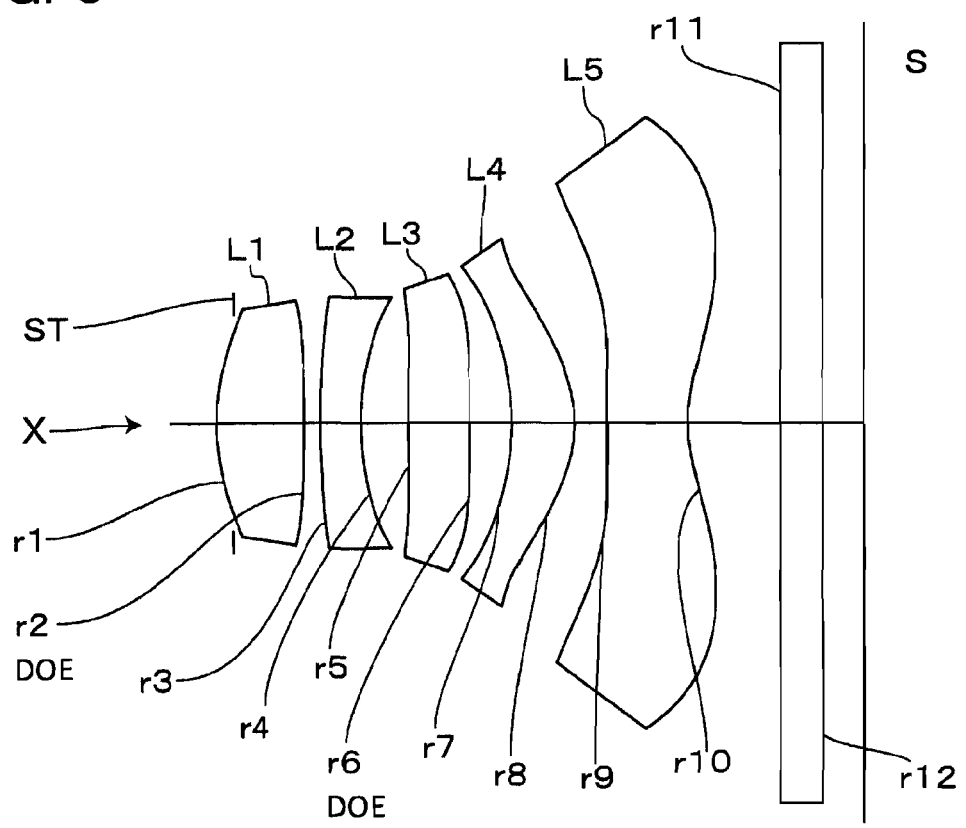
FIG. 3 is a sectional view of an imaging lens according to a second embodiment of the present invention.

FIG. 2 shows spherical aberration (mm), astigmatism (mm), distortion (%), and chromatic aberration of magnification (mm) of the imaging lens in the first embodiment. Among these aberration diagrams, the spherical aberration diagram shows the amounts of aberration of wavelengths of g-ray (435.84 nm), F-ray (486.13 nm), e-ray (546.07 nm), d-ray (587.56 nm), and C-ray (656.27 nm) and the astigmatism diagram shows the amount of aberration on sagittal image surface S and the amount of aberration on tangential image surface T (the same is true for FIGS. 2, 4, 6, and 8). As shown in FIG. 2, in the imaging lens according to the first embodiment, chromatic aberration is properly corrected and other types of aberrations are also properly corrected.

Second Embodiment

Basic lens data is shown below in Table 3. In the second embodiment, diffractive optical surfaces DOE are formed on the image side surface r2 of the first lens L1 and the image side surface r6 of the third lens L3.

TABLE 3

Surface data

| Surface No. | r | d | n | ν |
|---|---|---|---|---|
| Object surface | ∞ | ∞ | | |
| 1 (stop) | 1.7435 | 0.6272 | 1.5386 | 56.1 |
| 2 (DOE) | −25.0134 | 0.1223 | | |
| 3 | 6.1999 | 0.29 | 1.6246 | 25.4 |
| 4 | 2.1271 | 0.3442 | | |
| 5 | 13.5121 | 0.441 | 1.5386 | 56.1 |
| 6 (DOE) | −24.9881 | 0.307 | | |
| 7 | −1.7117 | 0.4525 | 1.5386 | 56.1 |
| 8 | −0.9192 | 0.2342 | | |
| 9 | 15.3085 | 0.5818 | 1.5386 | 56.1 |
| 10 | 1.1643 | 0.6589 | | |
| 11 | ∞ | 0.300 | 1.5201 | 64.0 |
| 12 | ∞ | 0.300 | | |
| Image plane | ∞ | | | | f = 3.9118, Fno = 2.5075, ω = 36.0°

Next, data on aspheric surface coefficients and coefficients of optical path difference function of the diffractive optical surfaces in the second embodiment are listed in Table 4

TABLE 4

Aspheric data

| First surface Aspheric coefficient | Second surface Aspheric coefficient |
|---|---|
| k = −2.5162E+00 | k = 30.2537E+00 |
| A2 = 0.0000E+00 | A2 = 0.0000E+00 |
| A4 = 4.0207E−02 | A4 = −1.1497E−01 |
| A6 = −2.1024E−02 | A6 = 3.8048E−01 |
| A8 = −2.5527E−02 | A8 = −1.2234E+00 |
| A10 = 1.4059E−02 | A10 = 2.0569E+00 |
| A12 = −2.783E−03 | A12 = −1.6488E+00 |
| A14 = −2.4939E−02 | A14 = 2.0131E−01 |
| A16 = 0.0000E+00 | A16 = 2.8907E−01 |

| Third surface Aspheric coefficient | Fourth surface Aspheric coefficient |
|---|---|
| k = 19.8304E+00 | k = −5.6192E−01 |
| A2 = 0.0000E+00 | A2 = 0.0000E+00 |
| A4 = −1.0725E−01 | A4 = −6.0153E−02 |
| A6 = 2.6507E−01 | A6 = 2.0808E−01 |
| A8 = −4.7904E−01 | A8 = −1.7964E−01 |
| A10 = 6.4105E−01 | A10 = 4.8724E−02 |
| A12 = −4.9378E−01 | A12 = 1.0961E−01 |
| A14 = 1.5748E−01 | A14 = −6.5626E−02 |
| A16 = 0.0000E+00 | A16 = 0.0000E+00 |

| Fifth surface Aspheric coefficient | Sixth surface Aspheric coefficient |
|---|---|
| k = 31.8147E+00 | k = 99.0E+00 |
| A2 = 0.0000E+00 | A2 = 0.0000E+00 |
| A4 = −9.5507E−02 | A4 = −5.726E−02 |
| A6 = 1.8881E−02 | A6 = 1.674E−04 |
| A8 = −1.7266E−01 | A8 = −8.6713E−02 |
| A10 = 5.0398E−01 | A10 = 3.0549E−02 |
| A12 = −6.0390E−01 | A12 = 5.2389E−02 |
| A14 = 2.8786E−01 | A14 = −7.8342E−02 |
| A16 = 0.0000E+00 | A16 = 3.9277E−02 |

| Seventh surface Aspheric coefficient | Eighth surface Aspheric coefficient |
|---|---|
| k = 1.0806E+00 | k = −3.8853E+00 |
| A2 = 0.0000E+00 | A2 = 0.0000E+00 |
| A4 = 1.4177E−01 | A4 = −1.5067E−01 |
| A6 = −1.0358E−01 | A6 = 1.1443E−01 |
| A8 = 1.5917E−01 | A8 = −6.4486E−03 |
| A10 = −1.4560E−01 | A10 = −1.431E−02 |
| A12 = 2.0409E−02 | A12 = 5.9341E−03 |
| A14 = 3.0247E−02 | A14 = 1.6903E−03 |

TABLE 4-continued

Aspheric data

| A16 = 0.0000E+00 | A16 = −1.319E−03 |
|---|---|

| Ninth surface Aspheric coefficient | Tenth surface Aspheric coefficient |
|---|---|
| k = 70.7472E+00 | k = −7.9362E+00 |
| A2 = 0.0000E+00 | A2 = 0.0000E+00 |
| A4 = −1.3537E−01 | A4 = −7.8755E−02 |
| A6 = 7.8787E−03 | A6 = 1.9549E−02 |
| A8 = 3.2322E−02 | A8 = −3.611E−03 |
| A10 = −1.452E−02 | A10 = 3.626E−04 |
| A12 = 7.284E−04 | A12 = −4.56E−05 |
| A14 = 8.372E−04 | A14 = 6.66E−06 |
| A16 = −1.47E−04 | A16 = −5.45E−07 |

| Second surface Optical path difference function | Sixth surface Optical path difference function |
|---|---|
| B2 = −5.254E−03 | B2 = 7.982E−04 |
| B4 = 2.1891E−02 | B4 = 1.50E−03 |
| B6 = −1.3709E−02 | B6 = −7.15E−04 |
| B8 = 4.5891E−01 | B8 = −7.42E−04 |
| B10 = −8.3865E−01 | B10 = 1.33E−04 |
| B12 = 7.9699E−01 | B12 = 1.82E−04 |
| B14 = −3.0695E−01 | B14 = −1.74E−05 |

(1) f2/f = −1.3727
(2) f3/f = 4.3096
(3) f45/f = −5.5833
(4) fDOE1/f = 23.16
(5) |fDOE2/f| = 152.48
(6) |fDOE2/fDOE1| = 6.5817

Therefore, the imaging lens in the second embodiment satisfies conditional expressions (1) to (6).

Figure 4:
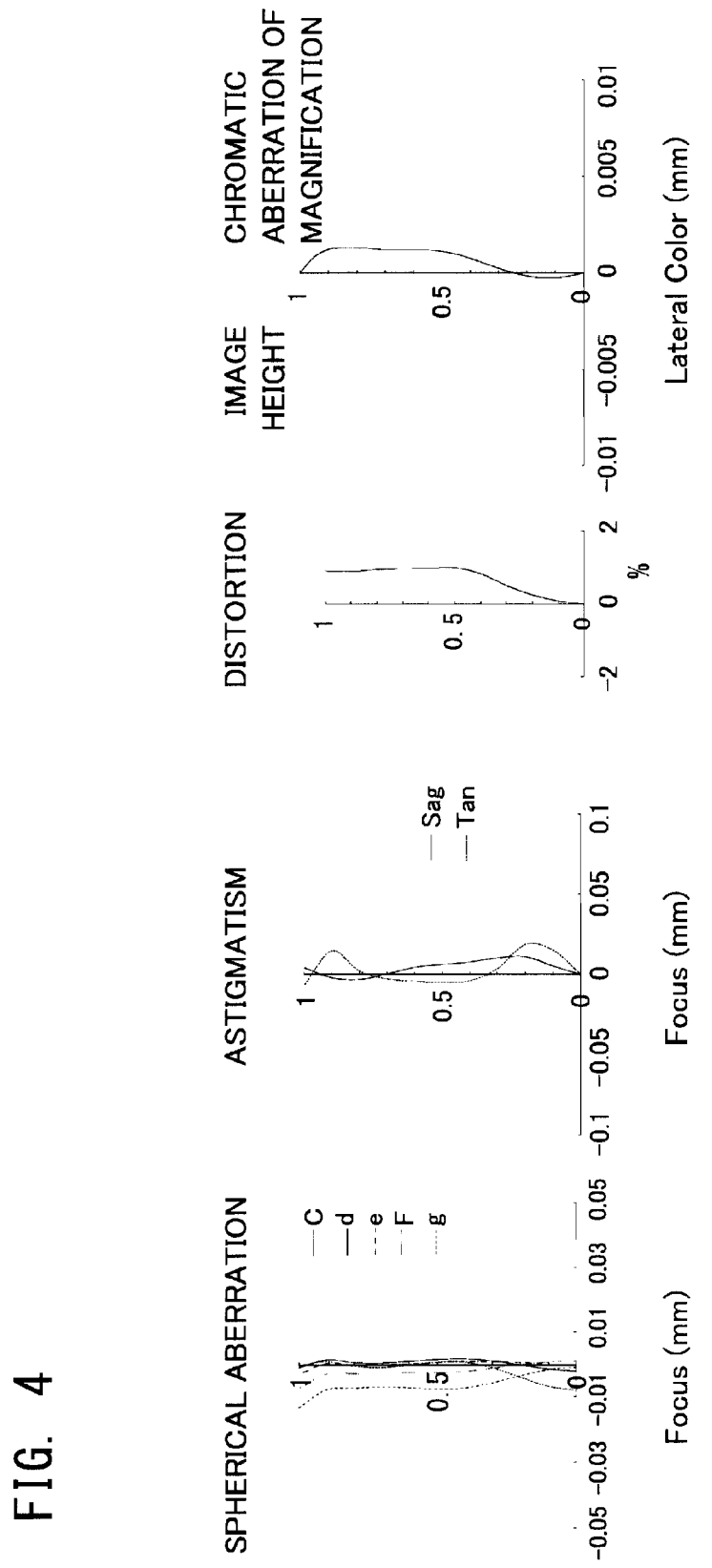
FIG. 4 shows various types of aberrations according to the second embodiment.
Figure 5:
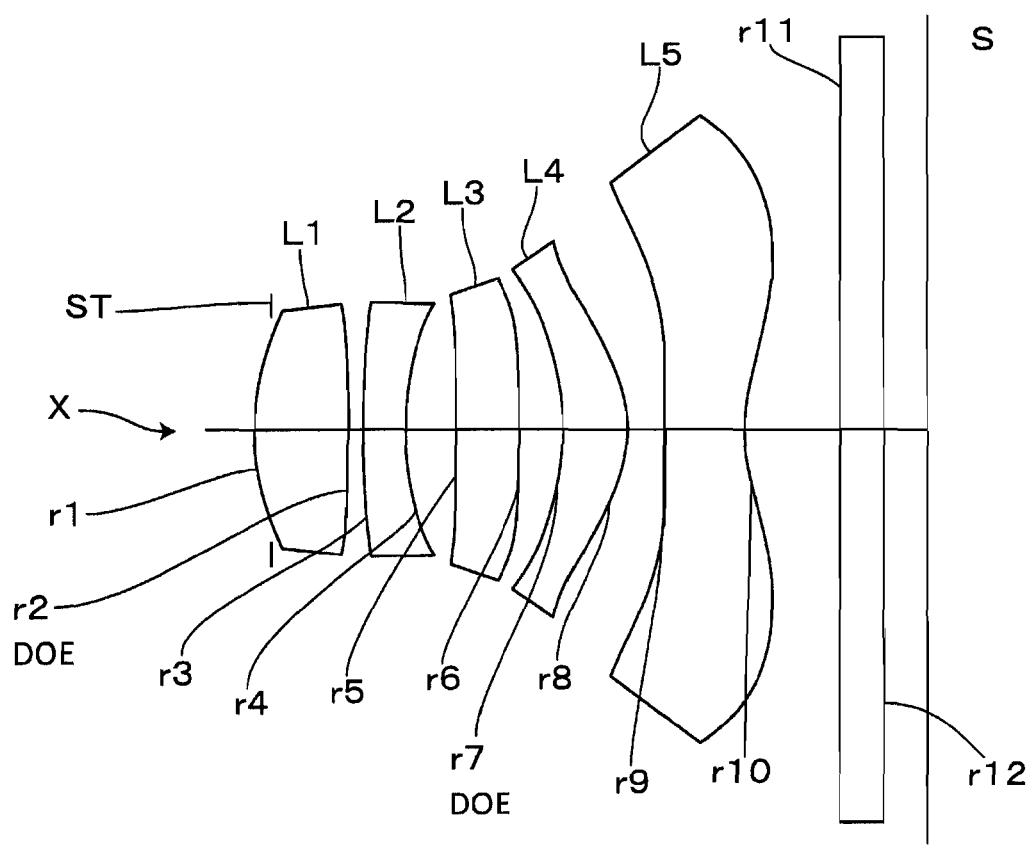
FIG. 5 is a sectional view of an imaging lens according to a third embodiment of the present invention.

FIG. 4 shows spherical aberration (mm), astigmatism (mm), distortion (%), and chromatic aberration of magnification (mm) of the imaging lens in the second embodiment. As shown in FIG. 4, in the imaging lens according to the second embodiment, chromatic aberration is properly corrected and other types of aberrations are also properly corrected.

Third Embodiment

Basic lens data is shown below in Table 5. In the third embodiment, diffractive optical surfaces DOE are formed on the image side surface r2 of the first lens L1 and the object side surface r7 of the fourth lens L4.

TABLE 5

Surface data

| Surface No. | r | d | n | ν |
|---|---|---|---|---|
| Object surface | ∞ | ∞ | | |
| 1 (stop) | 1.7149 | 0.6516 | 1.5386 | 56.1 |
| 2 (DOE) | −25.0134 | 0.1032 | | |
| 3 | 6.1999 | 0.29 | 1.6246 | 25.4 |
| 4 | 2.1058 | 0.3513 | | |
| 5 | 15.0446 | 0.4410 | 1.5386 | 56.1 |
| 6 | −24.9881 | 0.307 | | |
| 7 (DOE) | −1.7138 | 0.4478 | 1.5386 | 56.1 |
| 8 | −0.9175 | 0.2577 | | |
| 9 | 15.2843 | 0.5507 | 1.5386 | 56.1 |
| 10 | 1.1480 | 0.6589 | | |
| 11 | ∞ | 0.300 | 1.5201 | 64.0 |
| 12 | ∞ | 0.300 | | |
| Image plane | ∞ | | | | f = 3.9354, Fno = 2.5066, ω = 35.9°

Next, data on aspheric surface coefficients and coefficients of optical path difference function of the diffractive optical surfaces in the third embodiment are listed in Table 6.

TABLE 6

Aspheric data

| First surface Aspheric coefficient | Second surface Aspheric coefficient |
|---|---|
| k = −2.3271E+00 | k = −99.0E+00 |
| A2 = 0.0000E+00 | A2 = 0.0000E+00 |
| A4 = 4.3840E−02 | A4 = −1.0147E−01 |
| A6 = −2.1049E−02 | A6 = 4.1108E−01 |
| A8 = 6.341E−04 | A8 = −1.3381E+00 |
| A10 = −2.5935E−02 | A10 = 2.2016E+00 |
| A12 = 2.8142E−02 | A12 = −1.6945E+00 |
| A14 = −2.7338E−02 | A14 = 1.8142E−01 |
| A16 = 0.0000E+00 | A16 = 3.0134E−01 |

| Third surface Aspheric coefficient | Fourth surface Aspheric coefficient |
|---|---|
| k = 23.09719E+00 | k = −5.1907E−01 |
| A2 = 0.0000E+00 | A2 = 0.0000E+00 |
| A4 = −1.0467E−01 | A4 = −5.9401E−02 |
| A6 = 2.4984E−01 | A6 = 1.9913E−01 |
| A8 = −4.3428E−01 | A8 = −1.8619E−01 |
| A10 = 5.1856E−01 | A10 = 9.2738E−02 |
| A12 = −3.5882E−01 | A12 = 3.7248E−02 |
| A14 = 1.1075E−01 | A14 = −1.7904E−02 |
| A16 = 0.0000E+00 | A16 = 0.0000E+00 |

| Fifth surface Aspheric coefficient | Sixth surface Aspheric coefficient |
|---|---|
| k = 16.7356E+00 | k = 99.00E+00 |
| A2 = 0.0000E+00 | A2 = 0.0000E+00 |
| A4 = −9.6994E−02 | A4 = −6.1901E−02 |
| A6 = 2.0307E−02 | A6 = 2.6103E−03 |
| A8 = −1.7033E−01 | A8 = −8.8958E−02 |
| A10 = 4.9980E−01 | A10 = 3.0806E−02 |
| A12 = −6.0909E−01 | A12 = 5.2978E−02 |
| A14 = 2.9733E−01 | A14 = −7.8092E−02 |
| A16 = 0.0000E+00 | A16 = 3.9223E−02 |

| Seventh surface Aspheric coefficient | Eighth surface Aspheric coefficient |
|---|---|
| k = 1.0958E+00 | k = −3.9988E+00 |
| A2 = 0.0000E+00 | A2 = 0.0000E+00 |
| A4 = 1.4894E−01 | A4 = −1.5100E−01 |
| A6 = −1.1115E−01 | A6 = 1.1446E−01 |
| A8 = 1.6001E−01 | A8 = −6.699E−03 |
| A10 = −1.4518E−01 | A10 = −1.4392E−02 |
| A12 = 2.0499E−02 | A12 = 5.9248E−03 |
| A14 = 3.0251E−02 | A14 = 1.7049E−03 |
| A16 = 0.0000E+00 | A16 = −1.299E−03 |

| Ninth surface Aspheric coefficient | Tenth surface Aspheric coefficient |
|---|---|
| k = 71.3146E+00 | k = −8.0703E+00 |
| A2 = 0.0000E+00 | A2 = 0.0000E+00 |
| A4 = −1.3935E−01 | A4 = −8.1101E−02 |
| A6 = 8.1265E−03 | A6 = 2.0035E−02 |
| A8 = 3.2414E−02 | A8 = −3.67E−03 |
| A10 = −1.4505E−02 | A10 = 3.6E−04 |
| A12 = 7.3E−04 | A12 = −4.55E−05 |
| A14 = 8.369E−04 | A14 = 6.70E−06 |
| A16 = −1.47E−04 | A16 = −5.50E−07 |

| Second surface Optical path difference function | Seventh surface Optical path difference function |
|---|---|
| B2 = −3.681E−03 | B2 = −9.78E−04 |
| B4 = 1.9118E−02 | B4 = 4.60E−03 |
| B6 = −1.5231E−01 | B6 = −2.15E−03 |
| B8 = 5.4638E−01 | B8 = −1.02E−03 |
| B10 = −1.0103E+00 | B10 = 1.19E−04 |
| B12 = 9.4899E−01 | B12 = 2.18E−04 |
| B14 = −3.5857E−01 | B14 = 4.48E−05 |

TABLE 6-continued

Aspheric data (1) f2/f = −1.3436
(2) f3/f = 4.4616
(3) f45/f = −5.3430
(4) fDOE1/f = 32.87
(5) |fDOE2/f| = 123.76
(6) |fDOE2/fDOE1| = 3.7651

Therefore, the imaging lens in the third embodiment satisfies conditional expressions (1) to (6).

Figure 6:
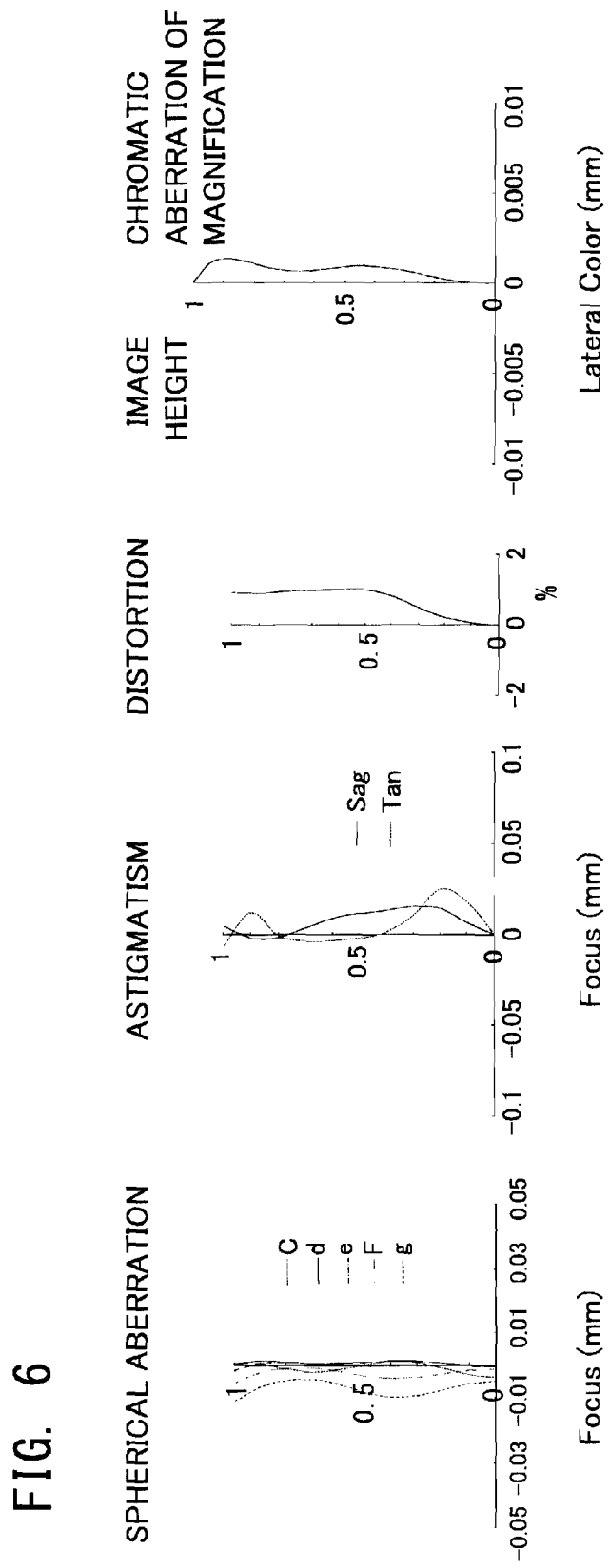
FIG. 6 shows various types of aberrations according to the third embodiment.
Figure 7:
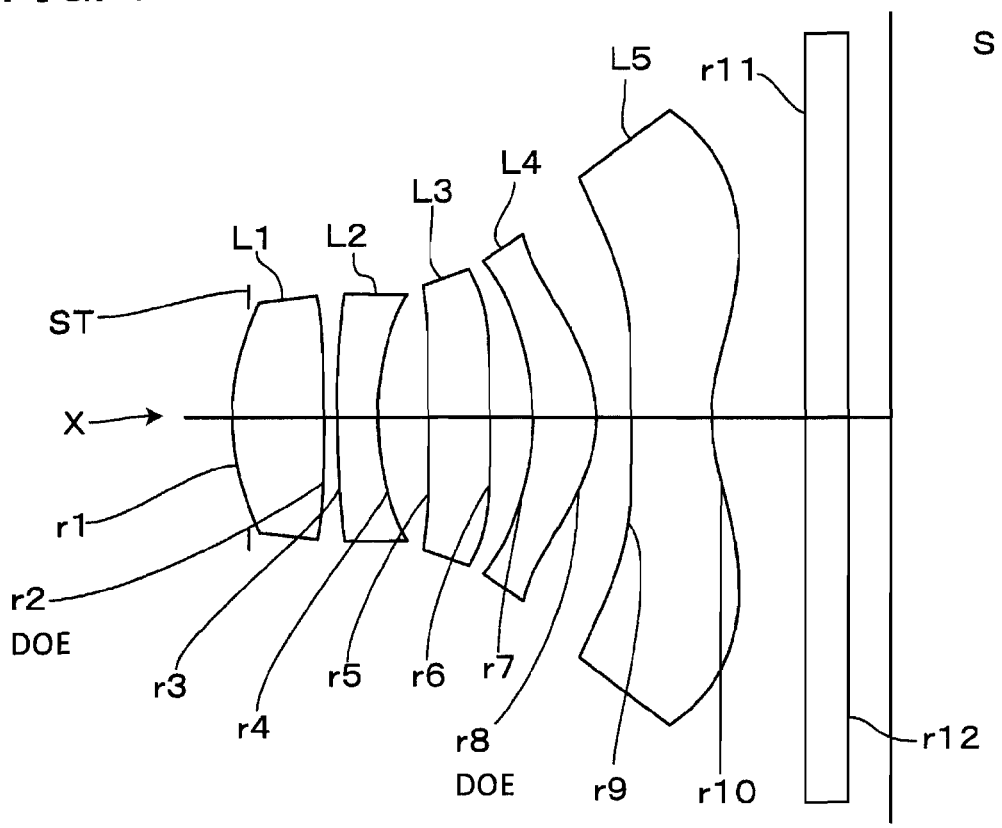
FIG. 7 is a sectional view of an imaging lens according to a fourth embodiment of the present invention.

FIG. 6 shows spherical aberration (mm), astigmatism (mm), distortion (%), and chromatic aberration of magnification (mm) of the imaging lens in the third embodiment. As shown in FIG. 6, in the imaging lens according to the third embodiment, chromatic aberration is properly corrected and other types of aberrations are also properly corrected.

Fourth Embodiment

Basic lens data is shown below in Table 7. In the fourth embodiment, diffractive optical surfaces DOE are formed on the image side surface r2 of the first lens L1 and the image side surface r8 of the fourth lens L4.

TABLE 7

Surface data

| Surface No. | r | d | n | v |
|---|---|---|---|---|
| Object surface | ∞ | ∞ | | |
| 1 (stop) | 1.7007 | 0.6485 | 1.5386 | 56.1 |
| 2 (DOE) | −25.0134 | 0.0943 | | |
| 3 | 6.1999 | 0.290 | 1.6246 | 26.4 |
| 4 | 2.0904 | 0.3542 | | |
| 5 | 15.2768 | 0.441 | 1.5386 | 56.1 |
| 6 | −24.9881 | 0.307 | | |
| 7 | −1.7127 | 0.449 | 1.5386 | 56.1 |
| 8 (DOE) | −0.9175 | 0.2456 | | |
| 9 | 15.2864 | 0.5700 | 1.5386 | 56.1 |
| 10 | 1.1532 | 0.6590 | | |
| 11 | ∞ | 0.300 | 1.5201 | 64.0 |
| 12 | ∞ | 0.300 | | |
| Image plane | ∞ | | | | f = 3.9277, Fno = 2.5177, ω = 35.9°

Next, data on aspheric surface coefficients and coefficients of optical path difference function of the diffractive optical surfaces in the fourth embodiment are listed in Table 8.

TABLE 8

Aspheric data

| First surface Aspheric coefficient | Second surface Aspheric coefficient |
|---|---|
| k = −2.2869E+00 | k = −89.6095E+00 |
| A2 = 0.0000E+00 | A2 = 0.0000E+00 |
| A4 = 4.4876E−02 | A4 = −1.0089E−02 |
| A6 = −1.9566E−02 | A6 = 4.1415E−01 |
| A8 = −8.42E−04 | A8 = −1.3713E+00 |
| A10 = −2.7193E−02 | A10 = 2.3124E+00 |
| A12 = 2.9092E−02 | A12 = −1.8651E+00 |
| A14 = −2.7338E−02 | A14 = 2.7947E−01 |
| A16 = 0.0000E+00 | A16 = 3.0134E−01 |

| Third surface Aspheric coefficient | Fourth surface Aspheric coefficient |
|---|---|
| k = 22.5293E+00 | k = −4.7775E−01 |
| A2 = 0.0000E+00 | A2 = 0.0000E+00 |
| A4 = −1.0522E−01 | A4 = −5.8784E−02 |
| A6 = 2.5572E−01 | A6 = 1.9847E−01 |
| A8 = −4.4895E−01 | A8 = −1.8564E−01 |
| A10 = 5.2687E−01 | A10 = 9.4369E−02 |
| A12 = −3.6791E−01 | A12 = 2.5754E−02 |
| A14 = 1.2684E−01 | A14 = −2.913E−03 |
| A16 = 0.0000E+00 | A16 = 0.0000E+00 |

| Fifth surface Aspheric coefficient | Sixth surface Aspheric coefficient |
|---|---|
| k = 8.5442E+00 | k = 53.2285E+00 |
| A2 = 0.0000E+00 | A2 = 0.0000E+00 |
| A4 = −9.7491E−02 | A4 = −5.9472E−02 |
| A6 = 2.0681E−02 | A6 = 2.701E−04 |
| A8 = −1.7099E−01 | A8 = −8.9924E−02 |
| A10 = 4.9913E−01 | A10 = 3.0685E−02 |
| A12 = −6.0906E−01 | A12 = 5.3135E−02 |
| A14 = 2.9948E−01 | A14 = −7.7907E−02 |
| A16 = 0.0000E+00 | A16 = 3.9360E−02 |

| Seventh surface Aspheric coefficient | Eighth surface Aspheric coefficient |
|---|---|
| k = 1.0964E+00 | k = −3.9994E+00 |
| A2 = 0.0000E+00 | A2 = 0.0000E+00 |
| A4 = 1.5147E−01 | A4 = −1.5143E−01 |
| A6 = −1.1322E−01 | A6 = 1.1432E−01 |
| A8 = 1.5997E−01 | A8 = −6.753E−03 |
| A10 = −1.4512E−01 | A10 = −1.4413E−02 |
| A12 = 2.0483E−02 | A12 = 5.9167E−03 |
| A14 = 3.0214E−02 | A14 = 1.7019E−03 |
| A16 = 0.0000E+00 | A16 = −1.3E−03 |

| Ninth surface Aspheric coefficient | Tenth surface Aspheric coefficient |
|---|---|
| k = 71.3192E+00 | k = −3.9994E+00 |
| A2 = 0.0000E+00 | A2 = 0.0000E+00 |
| A4 = −1.3853E−01 | A4 = −7.9781E−02 |
| A6 = 8.1333E−03 | A6 = 1.9696E−02 |
| A8 = 3.2403E−02 | A8 = −3.639E−03 |
| A10 = −1.4508E−02 | A10 = 3.64E−04 |
| A12 = 7.29E−04 | A12 = −4.54E−05 |
| A14 = 8.367E−04 | A14 = 6.67E−06 |
| A16 = −1.47E−04 | A16 = −5.56E−07 |

| Second surface Optical path difference function | Fifth surface Optical path difference function |
|---|---|
| B2 = −3.694E−03 | B2 = −4.21E−04 |
| B4 = 1.8300E−02 | B4 = 2.38E−03 |
| B6 = −1.4762E−01 | B6 = −8.09E−04 |
| B8 = 5.4540E−01 | B8 = −2.10E−04 |
| B10 = −1.042E+00 | B10 = −2.23E−05 |
| B12 = 1.0096E+00 | B12 = 1.43E−05 |
| B14 = −3.9238E−01 | B14 = 1.53E−05 |

(1) f2/f = −1.3312
(2) f3/f = 4.513
(3) f45/f = −5.4668
(4) fDOE1/f = 32.81
(5) |fDOE2/f| = 287.76
(6) |fDOE2/fDOE1| = 8.7697

Therefore, the imaging lens in the fourth embodiment satisfies conditional expressions (1) to (6).

Figure 8:
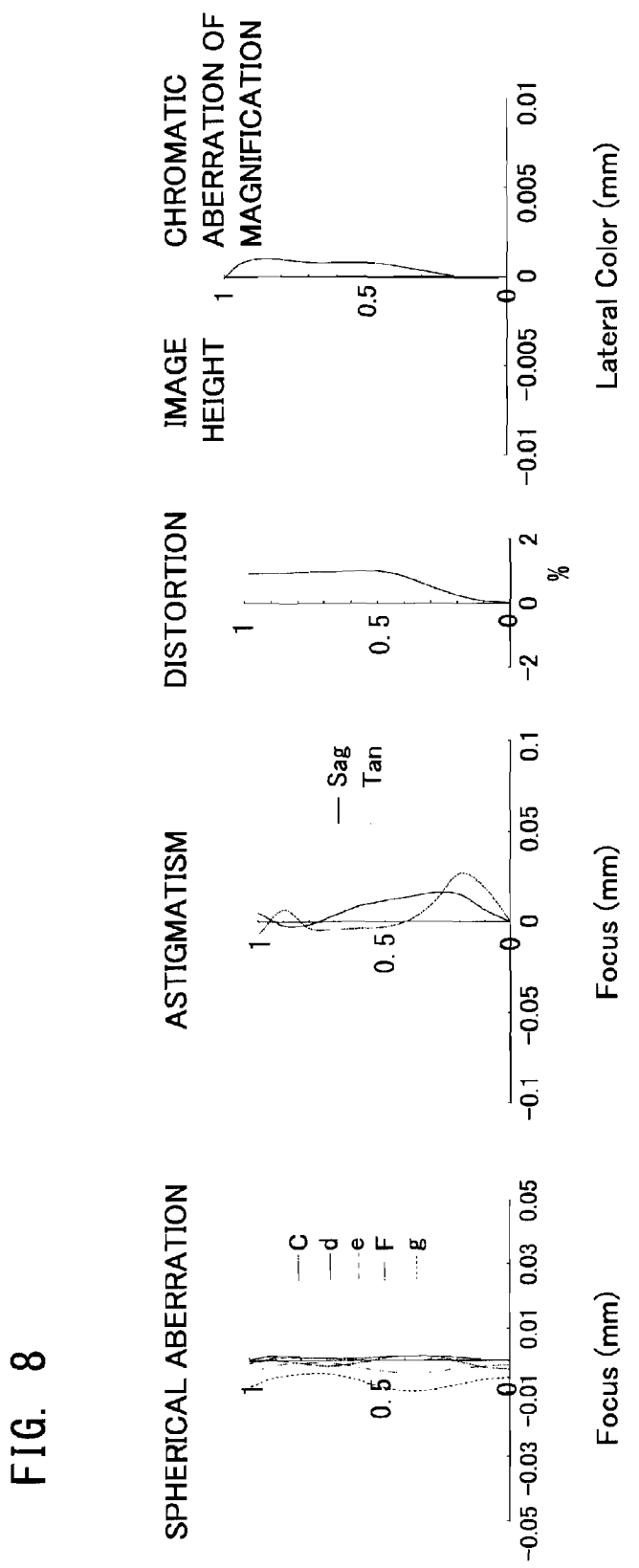
FIG. 8 shows various types of aberrations according to the fourth embodiment.
Figure 9:
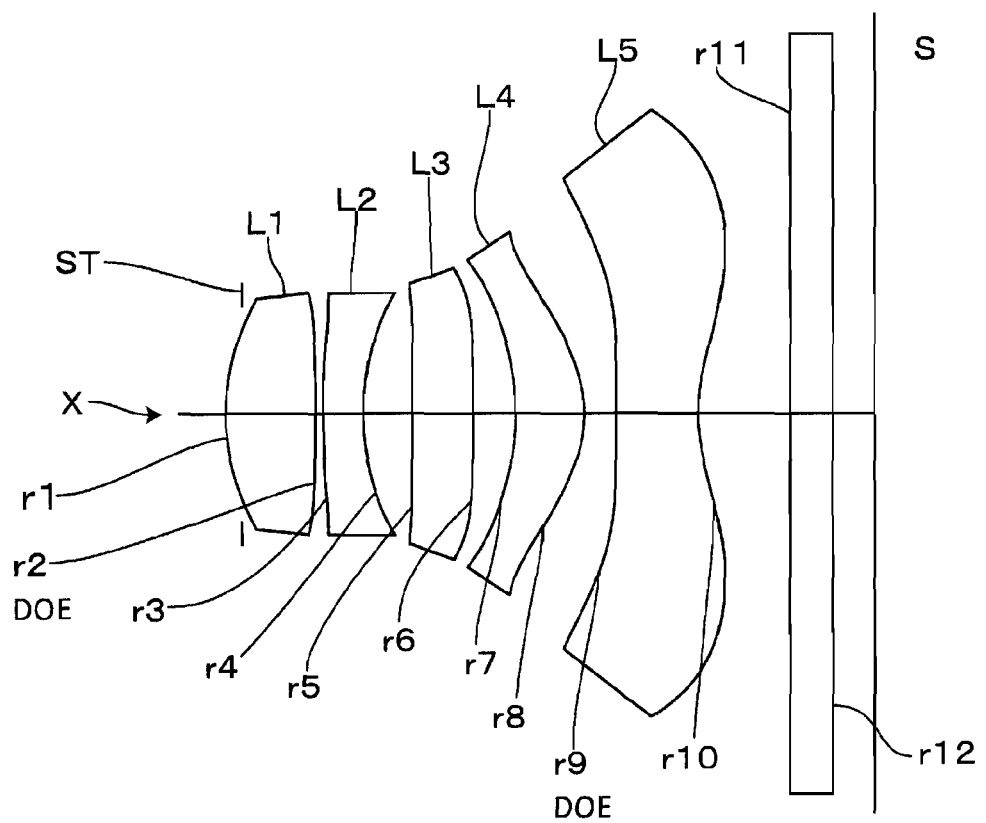
FIG. 9 is a sectional view of an imaging lens according to a fifth embodiment of the present invention.

FIG. 8 shows spherical aberration (mm), astigmatism (mm), distortion (%), and chromatic aberration of magnification (mm) of the imaging lens in the fourth embodiment. As shown in FIG. 8, in the imaging lens according to the fourth embodiment, chromatic aberration is properly corrected and other types of aberrations are also properly corrected.

Fifth Embodiment

Basic lens data is shown below in Table 9. In the fifth embodiment, diffractive optical surfaces DOE are formed on the image side surface r2 of the first lens L1 and the object side surface r9 of the fifth lens L5.

TABLE 9

Surface data

| Surface No. | r | d | n | v |
|---|---|---|---|---|
| Object surface | ∞ | ∞ | | |
| 1 (stop) | 1.6039 | 0.6453 | 1.5386 | 56.1 |
| 2 (DOE) | −21.4525 | 0.0577 | | |
| 3 | 6.1999 | 0.290 | 1.6242 | 25.4 |
| 4 | 1.9099 | 0.3488 | | |
| 5 | 13.9028 | 0.441 | 1.5386 | 56.1 |
| 6 | −24.9881 | 0.307 | | |
| 7 | −1.6946 | 0.4923 | 1.5386 | 56.1 |
| 8 | −0.9116 | 0.2312 | | |
| 9 (DOE) | 19.7484 | 0.5870 | 1.5386 | 56.1 |
| 10 | 1.1760 | 0.659 | | |
| 11 | ∞ | 0.300 | 1.5201 | 64.0 |
| 12 | ∞ | 0.300 | | |
| Image plane | ∞ | | | |

$f = 3.9177$, Fno = 2.511, $\omega = 36.0°$

Next, data on aspheric surface coefficients and coefficients of optical path difference function of the diffractive optical surfaces in the fifth embodiment are listed in Table 10.

TABLE 10

Aspheric data

| First surface Aspheric coefficient | Second surface Aspheric coefficient |
|---|---|
| k = −1.9888E+00 | k = −99.0E+00 |
| A2 = 0.0000E+00 | A2 = 0.0000E+00 |
| A4 = 5.3294E−02 | A4 = −7.9888E−02 |
| A6 = −7.606E−03 | A6 = 4.6038E−01 |
| A8 = −4.198E−03 | A8 = −1.5781E+00 |
| A10 = −3.5497E−02 | A10 = 2.5008E+00 |
| A12 = 6.9878E−02 | A12 = −1.8543E+00 |
| A14 = −7.456E−02 | A14 = 1.4360E−01 |
| A16 = 0.0000E+00 | A16 = 3.2651E−01 |

| Third surface Aspheric coefficient | Fourth surface Aspheric coefficient |
|---|---|
| k = 40.4698E+00 | k = −3.9589E−01 |
| A2 = 0.0000E+00 | A2 = 0.0000E+00 |
| A4 = −1.1450E−01 | A4 = −5.7788E−02 |
| A6 = 2.0773E−02 | A6 = 2.1259E−01 |
| A8 = −6.3178E−01 | A8 = −1.9955E−01 |
| A10 = 5.1482E−01 | A10 = 2.0745E−02 |
| A12 = −9.7653E−02 | A12 = 1.8085E−01 |
| A14 = −1.1372E−01 | A14 = −1.0399E−01 |
| A16 = 0.0000E+00 | A16 = 0.0000E+00 |

| Fifth surface Aspheric coefficient | Sixth surface Aspheric coefficient |
|---|---|
| k = 77.2109E+00 | k = 7.2418E+00 |
| A2 = 0.0000E+00 | A2 = 0.0000E+00 |
| A4 = −9.3255E−02 | A4 = −4.9855E−02 |
| A6 = 2.0773E−02 | A6 = −1.07E−03 |
| A8 = −1.6868E−01 | A8 = −8.764E−03 |
| A10 = 5.0605E−01 | A10 = 3.0308E−02 |
| A12 = −6.0462E−01 | A12 = 5.2107E−02 |
| A14 = 2.8906E−01 | A14 = −7.8664E−02 |
| A16 = 0.0000E+00 | A16 = 3.8876E−02 |

| Seventh surface Aspheric coefficient | Eighth surface Aspheric coefficient |
|---|---|
| k = 1.0609E+00 | k = −3.8097E+00 |
| A2 = 0.0000E+00 | A2 = 0.0000E+00 |
| A4 = 1.4197E−01 | A4 = −1.5947E−01 |
| A6 = −9.968E−02 | A6 = 1.1578E−01 |

TABLE 10-continued

Aspheric data

| | |
|---|---|
| A8 = 1.6369E−01 | A8 = −6.225E−04 |
| A10 = −1.4844E−01 | A10 = −1.4136E−02 |
| A12 = 1.7614E−02 | A12 = 6.1199E−03 |
| A14 = 3.2681E−02 | A14 = 1.7114E−03 |
| A16 = 0.0000E+00 | A16 = −1.343E−03 |

| Ninth surface Aspheric coefficient | Tenth surface Aspheric coefficient |
|---|---|
| k = 55.6947E+00 | k = −8.1262E+00 |
| A2 = 0.0000E+00 | A2 = 0.0000E+00 |
| A4 = −1.3168E−01 | A4 = −8.0753E−02 |
| A6 = 8.0205E−03 | A6 = 2.0016E−02 |
| A8 = 3.2145E−02 | A8 = −3.672E−03 |
| A10 = −1.4624E−02 | A10 = 3.381E−04 |
| A12 = 7.096E−04 | A12 = −4.0E−05 |
| A14 = 8.428E−04 | A14 = 7.17E−06 |
| A16 = −1.42E−04 | A16 = −7.37E−07 |

| Second surface Optical path difference function | Fifth surface Optical path difference function |
|---|---|
| B2 = −2.685E−03 | B2 = −1.242E−03 |
| B4 = 1.5290E−02 | B4 = 2.10E−03 |
| B6 = −1.3846E−01 | B6 = −4.93E−04 |
| B8 = 5.4321E−01 | B8 = −5.84E−05 |
| B10 = −1.0665E+00 | B10 = −5.74E−07 |
| B12 = 1.0458E+00 | B12 = 2.27E−06 |
| B14 = −4.0622E+00 | B14 = 1.05E−06 |

(1) f2/f = −1.1667
(2) f3/f = 4.2637
(3) f45/f = −6.0560
(4) fDOE1/f = 45.26
(5) |fDOE2/f| = 97.86
(6) |fDOE2/fDOE1| = 2.1622

Therefore, the imaging lens in the fifth embodiment satisfies conditional expressions (1) to (6).

Figure 10:
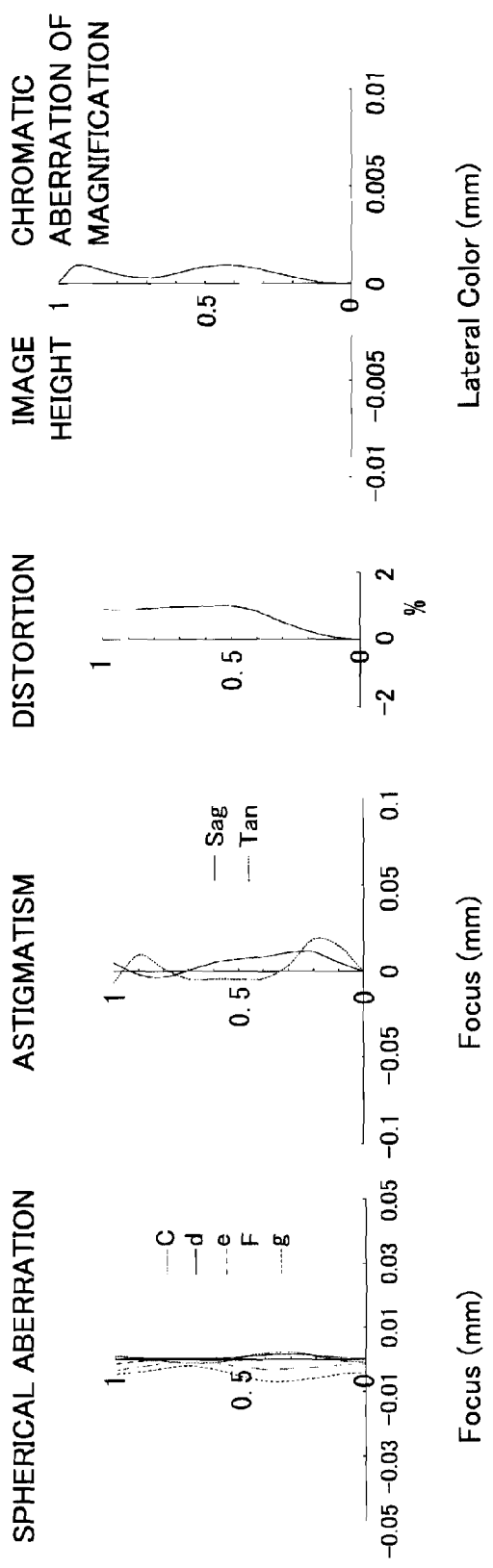
FIG. 10 shows various types of aberrations according to the fifth embodiment.

FIG. 10 shows spherical aberration (mm), astigmatism (mm), distortion (%), and chromatic aberration of magnification (mm) of the imaging lens in the fifth embodiment. As shown in FIG. 10, in the imaging lens according to the fifth embodiment, chromatic aberration is properly corrected and other types of aberrations are also properly corrected.

The present invention can be applied to compact image pickup devices with high pixel density. Particularly it provides a compact imaging lens with a small F-value which is mounted in a personal digital assistant such as a mobile phone and properly corrects chromatic aberration and other types of aberrations. It is highly applicable to imaging lenses for mobile phones or smart phones.

The effects of the present invention are as follows.

According to the present invention, by using five lenses and locating two diffractive optical surfaces in optimal places, it is possible to provide a compact high-performance imaging lens which corrects chromatic aberration more properly than before and also corrects other types of aberrations. Also a plastic material is used for all lenses, thereby permitting cost reduction.

What is claimed is:

1. An imaging lens for an image pickup device, comprising:
    a first lens, a second lens, a third lens, a fourth lens, and a fifth lens being arranged in order from an object side, wherein both sides of all the lenses are aspheric surfaces;
    wherein a diffractive optical surface with a chromatic aberration correction function is formed on one of surfaces from an object side surface of the first lens to an object side surface of the second lens and one of surfaces from an object side surface of the third lens to an object side surface of the fifth lens;

wherein the fifth lens is a lens with negative refractive power having a convex surface on the object side near an optical axis;

wherein all the lenses are made of a plastic material; and wherein the following conditional expressions are satisfied:

$$-2.80 \leq f2/f \leq -1.10 \quad (1)$$

$$2.80 \leq f3/f \leq 4.5206 \quad (2)$$

f: focal length of an overall optical system
f2: focal length of the second lens
f3: focal length of the third lens.

2. The imaging lens according to claim 1,
wherein the first lens is a biconvex lens near the optical axis, the second lens is a lens with negative refractive power, the third lens is a biconvex lens near the optical axis with positive refractive power, and the fourth lens is a meniscus lens with positive refractive power having a concave surface on the object side near the optical axis; and
wherein an aperture stop is located on the object side surface of the first lens.

3. The imaging lens according to claim 1, wherein the following conditional expression is satisfied:

$$-20.00 \leq f45/f \leq -3.33 \quad (3)$$

where:
f: focal length of an overall optical system
f45: composite focal length of the fourth lens and fifth lens.

4. The imaging lens according to claim 1, wherein the following conditional expressions are satisfied:

$$10 < fDOE1/f < 100 \quad (4)$$

$$10 < |fDOE2/f| \quad (5)$$

where:
fDOE1: focal length of a first diffractive surface
fDOE2: focal length of a second diffractive surface.

5. The imaging lens according to claim 1, wherein the following conditional expression is satisfied:

$$1 < |fDOE2/fDOE1| < 30 \quad (6)$$

where:
fDOE1: focal length of a first diffractive surface
fDOE2: focal length of a second diffractive surface.

6. The imaging lens according to claim 2, wherein the following conditional expression is satisfied:

$$-20.00 \leq f45/f \leq -3.33 \quad (3)$$

where:
f: focal length of an overall optical system
f45: composite focal length of the fourth lens and fifth lens.

7. The imaging lens according to claim 2, wherein the following conditional expressions are satisfied:

$$10 < fDOE1/f < 100 \quad (4)$$

$$10 < |fDOE2/f| \quad (5)$$

where:
fDOE1: focal length of a first diffractive surface
fDOE2: focal length of a second diffractive surface.

8. The imaging lens according to claim 2, wherein the following conditional expression is satisfied:

$$1 < |fDOE2/fDOE1| < 30 \quad (6)$$

where:
fDOE1: focal length of a first diffractive surface
fDOE2: focal length of a second diffractive surface.

9. The imaging lens according to claim 3, wherein the following conditional expressions are satisfied:

$$10 < fDOE1/f < 100 \quad (4)$$

$$10 < |fDOE2/f| \quad (5)$$

where:
fDOE1: focal length of a first diffractive surface
fDOE2: focal length of a second diffractive surface.

10. The imaging lens according to claim 3, wherein the following conditional expression is satisfied:

$$1 < |fDOE2/fDOE1| < 30 \quad (6)$$

where:
fDOE1: focal length of a first diffractive surface
fDOE2: focal length of a second diffractive surface.

11. The imaging lens according to claim 4, wherein the following conditional expression is satisfied:

$$1 < |fDOE2/fDOE1| < 30 \quad (6).$$

12. The imaging lens according to claim 6, wherein the following conditional expressions are satisfied:

$$10 < fDOE1/f < 100 \quad (4)$$

$$10 < |fDOE2/f| \quad (5)$$

where:
fDOE1: focal length of a first diffractive surface
fDOE2: focal length of a second diffractive surface.

13. The imaging lens according to claim 6, wherein the following conditional expression is satisfied:

$$1 < |fDOE2/fDOE1| < 30 \quad (6)$$

where:
fDOE1: focal length of a first diffractive surface
fDOE2: focal length of a second diffractive surface.

14. The imaging lens according to claim 7, wherein the following conditional expression is satisfied:

$$1 < |fDOE2/fDOE1| < 30 \quad (6).$$

15. The imaging lens according to claim 9, wherein the following conditional expression is satisfied:

$$1 < |fDOE2/fDOE1| < 30 \quad (6).$$

16. The imaging lens according to claim 12, wherein the following conditional expression is satisfied:

$$1 < |fDOE2/fDOE1| < 30 \quad (6).$$

* * * * *